__United States Patent Office__  3,343,748  
Patented Sept. 26, 1967

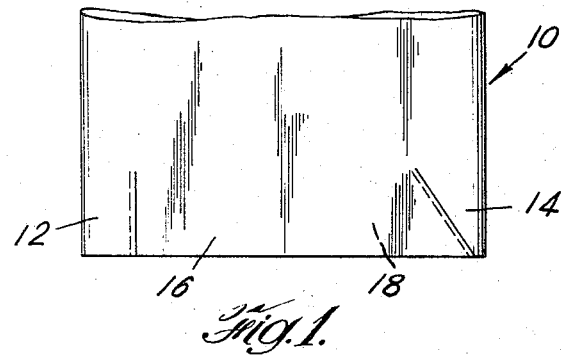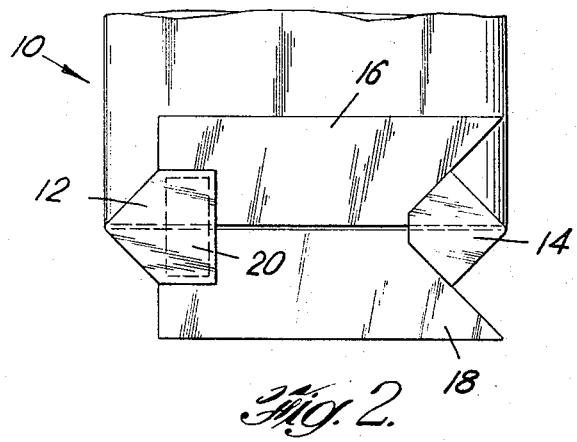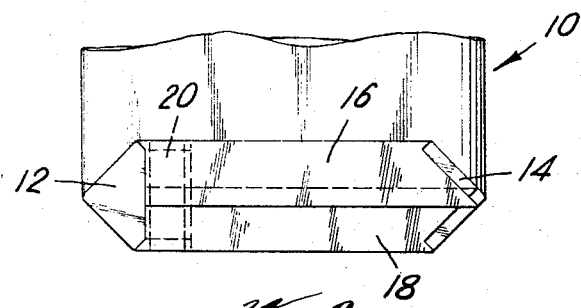

3,343,748  
SEAL BARRIERS FOR THERMOPLASTIC BAGS  
William L. Calvert, Westfield, N.J., assignor to Union Carbide Corporation, a corporation of New York  
Filed Apr. 25, 1966, Ser. No. 545,099  
1 Claim. (Cl. 229—59)

ABSTRACT OF THE DISCLOSURE

A square-ended polyethylene bag wherein at least one of its ends is pre-cut into two side flaps and two end flaps. The end flaps are infolded and a membrane of barrier material is inserted under one of the end flaps. The side flaps are infolded over the end flaps and sealed to each other and a portion of the side flaps are sealed to the end flap in the area backed up by the membrane of barrier material. The barrier material, because of its combined properties of heat capacity, thermal insulation, and resistance to melting or sticking, allows sealing of film layers above it while preventing sealing of film layers below it; and which, because of its low cost and compatibility with the material and function of the bag, becomes a permanent part of the bag. The barrier material can be polyethylene-polypropylene laminate, polyethylene coated polyethylene terephthalate, polyethylene coated paper wherein the polyethylene side of the aforesaid barrier materials is sealed to the underside of the aforesaid end flap. The barrier material can also be carboxyl containing olefin polymer coated aluminum foil wherein the carboxyl containing olefin polymer side of the barrier material is sealed to the underside of the end flap.

---

This invention relates to thermoplastic industrial bags and formation of the ends thereof and more particularly to square-ended thermoplastic bags having a seal barrier which does not require removal from the bag.

The manufacture of square-ended thermoplastic bags requires that each end of a bag be cut, folded and heat sealed in a particular configuration which will result in the desired rectangular, flat end when the bag is folded. Since the layers of film to be sealed overlie layers of film which must not be sealed, it is essential that some barrier be introduced between the two. Present day practice has been to form and seal the bottom of the bag around an internal platen which serves the barrier function. This platen is then withdrawn from the open top of the bag. The top of the bag is then formed and sealed around another internal platen and this platen is subsequently withdrawn from the valve opening of the bag. A major drawback of such a process is that the formation of both ends of the bag cannot be accomplished simultaneously resulting in additional time and expense to the manufacturer of the bag.

Accordingly, it is an object of this invention to provide thermoplastic bags of the above type with a seal barrier which does not require removal from the bag.

In accordance with the present invention, there is provided a square-ended thermoplastic bag wherein at least one of the ends comprises two side flaps and two end flaps. The end flaps are infolded and at least one end thereof has a membrane of barrier material inserted thereunder which is adapted to be sealed solely to the underside of the end flap. The side flaps are infolded over the end flaps and sealed to each other. A portion of the side flaps is sealed to the end flap in the area backed up by the barrier material.

A further aspect of the present invention includes a method of providing a square-ended thermoplastic bag with a barrier material which bag has been pre-cut to form a square bag end having two side flaps and two end flaps. Such a method comprises outfolding the side flaps followed by infolding of the end flaps. Thereupon, a barrier material is inserted under at least one end flap. This barrier material is then sealed to the underside of the end flap. The method further includes placing a forming platen over at least one of the infolded end flaps and infolding the side flaps over the platen followed by sealing the side flaps to each other. Subsequent thereto, the forming platen is removed and the side flaps are sealed to the end flaps in the area backed up by the barrier material.

In the drawing:

FIG. 1 is a plan view partly broken away and partially in phantom of the end of a thermoplastic bag in one aspect of the invention.

FIG. 2 is a similar view of the bag of FIG. 1 illustrating the outfolded side flaps and the infolded end flaps with the barrier material in place.

FIG. 3 is a similar view of the bag of FIG. 2 illustrating the folded positions of the flaps upon the insertion of the barrier material.

Referring now to the drawing, there is shown in FIG. 3 a collapsed thermoplastic bag 10 having two infolded end flaps 12, 14 and two infolded side flaps 16, 18. Disposed beneath the end flap 12 is a piece of barrier film 20 which is heat sealed to the underside face of the end flap 12.

In accordance with the method of the present invention, as shown in FIG. 1, one end of a piece of tubular film is suitably cut to form a square bag end. Such cutting defines two end flaps 12, 14 and two side flaps 16, 18. FIG. 2 shows the next step in the method, which consists of opening up the side flaps 16, 18 and infolding the end flaps 12, 14. It is at this point in the method that the piece of barrier film 20 is inserted under end flap 12 and heat sealed through end flap 12, without sealing to the bag body 10, to the underside face of end flap 12 in the position shown. In a subsequent operation, a forming platen is inserted, the side flaps 16, 18 are infolded over it, and the main seals are made against this back up. Finally, the forming platen is removed and the final closing seal is made in the area backed up by the barrier film 20. FIG. 3 illustrates the position of the barrier film 20 in the completed bag.

Thus, by inserting a membrane of material which, because of its combined properties of heat capacity, thermal insulation, and resistance to melting or sticking, will allow sealing of film layers above it while preventing sealing of film layers below it; and which because of its low cost and its compatibility with the material and function of the bag, can be allowed to become a permanent part of the bag.

While it is preferred to use as the barrier film a laminate of polyethylene, which heat seals readily to end flap 12, and polypropylene, which does not heat seal to the under layers of the bag film, many other types of materials can be used as well including polyethylene coated polyethylene terephthalate, carboxyl containing olefin polymer coated aluminum foil, various kinds of paper, polypropylene, and polyethylene coated paper. The transparent films and laminates are favored when it is desired that the barrier film not show while, in other applications, there are obvious advantages in having the barrier film bear a printed message or a distinctive color for identification. Where printing covers the entire area under the seal, the ink itself has been found to be an adequate against sealing through.

It is to be further noted that there are a great many configurations of cuts, folds, and seals which will form a desired bag end. It will be obvious to those skilled in the art that a barrier film can be incorporated in such configurations to perform substantially the same functions as described herein.

What is claimed is:

A square-ended polyethylene bag wherein at least one of said ends comprises two side flaps and two end flaps, said end flaps being infolded and at least one of said end flaps having a membrane of barrier material inserted thereunder and sealed solely to the underside of said end flap and wherein said barrier material is selected from the group consisting of polyethylene-polypropylene laminates, polyethylene coated polyethylene terephthalate, polyethylene coated paper wherein the polyethylene side of the aforesaid barrier materials is sealed to the underside of said end flap, and carboxyl containing olefin polymer coated aluminum foil wherein the carboxyl containing olefin polymer side of said barrier material is sealed to the underside of said end flap; said side flaps being infolded over said end flaps and sealed to each other, and a portion of said side flaps being sealed to the end flap in the area backed up by said membrane of barrier material.

References Cited
UNITED STATES PATENTS

| | | | |
|---|---|---|---|
| 2,956,723 | 10/1960 | Tritsch | 229—48 |
| 3,116,002 | 12/1963 | Crawford et al. | 229—17 |
| 3,117,711 | 1/1964 | Camerini | 229—57 |
| 3,188,265 | 6/1965 | Charbonneau | 161—412 |
| 3,247,290 | 4/1966 | Werkman et al. | 260—897 |
| 3,281,060 | 10/1966 | Heimos | 229—62.5 |

JOSEPH R. LECLAIR, *Primary Examiner.*

DAVID M. BOCKENEK, *Examiner.*